United States Patent [19]

Jones

[11] 4,223,700
[45] Sep. 23, 1980

[54] FLOW LINE SWITCH

[75] Inventor: Marvin R. Jones, Houston, Tex.

[73] Assignee: Cameron Iron Works, Inc., Houston, Tex.

[21] Appl. No.: 583

[22] Filed: Jan. 2, 1979

[51] Int. Cl.³ ............................................. F16K 11/02
[52] U.S. Cl. .............................. 137/874; 137/625.46; 137/876; 137/885; 406/182
[58] Field of Search ................... 137/625.46, 874, 876, 137/885; 406/182

[56] References Cited

U.S. PATENT DOCUMENTS

| | | | |
|---|---|---|---|
| 3,674,123 | 7/1972 | Lewis et al. | 137/625.46 X |
| 3,780,756 | 12/1973 | Pennington | 137/874 X |
| 4,133,418 | 1/1979 | Van Bilderbeek | 137/874 X |

Primary Examiner—Gerald A. Michalsky
Attorney, Agent, or Firm—Vinson & Elkins

[57] ABSTRACT

A flow line switch having a housing and a rotor mounted within the housing, an annular piston between the rotor and the housing and adapted to slide axially in the annulus between the rotor and housing, means for supplying and venting fluid to and from opposite ends of the annulus for movement of the piston, the rotor having a passageway extending therethrough adapted to connect to at least one port through the housing at one end and selectively to one of at least two ports at the other end and stop means at the extremities of travel of the piston to assure communication between the preselected ports.

14 Claims, 9 Drawing Figures

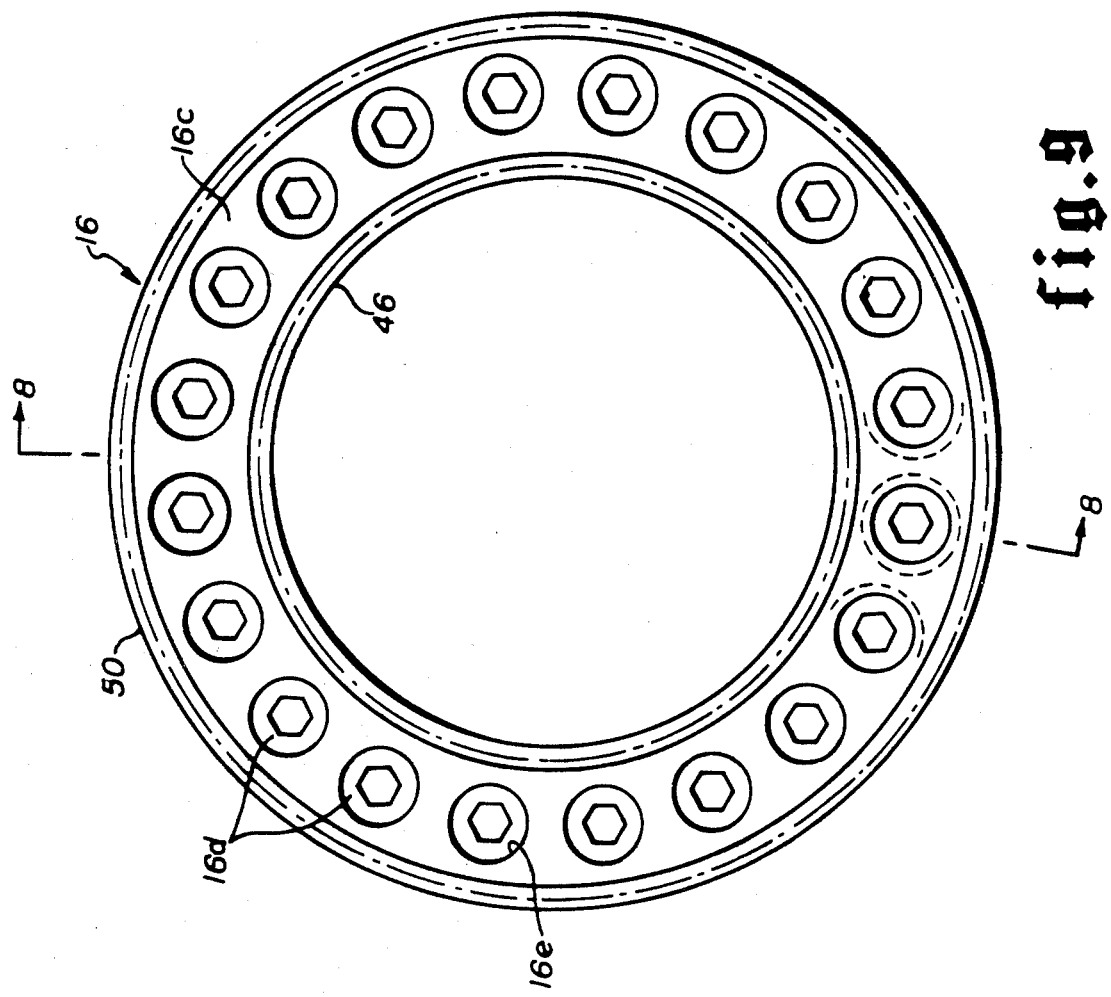
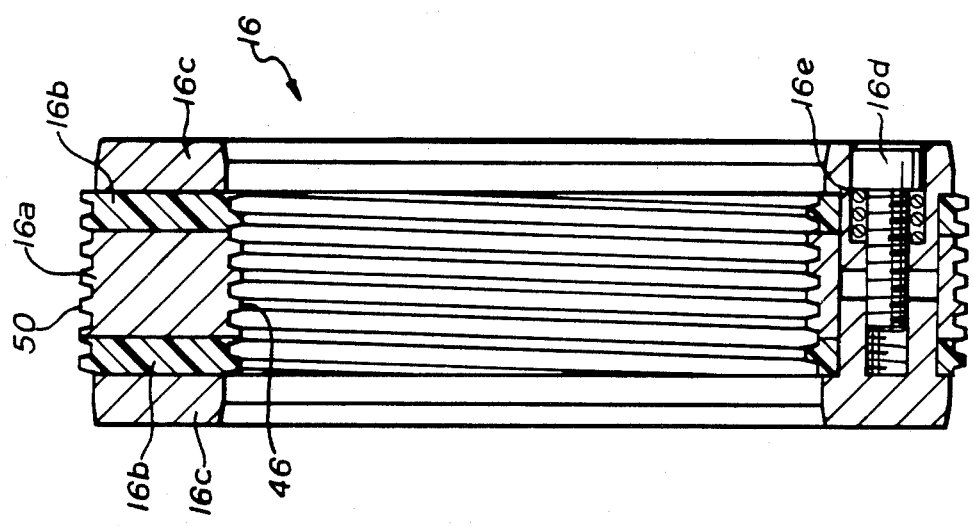

FLOW LINE SWITCH

BACKGROUND

Flow line switches or diverters of the prior art have been subject to problems of leakage of fluid into the closed branch, of not having a substantially constant diameter flow passage and of requiring complex mechanisms for assuring simultaneous operation of two switches in the same flow system. In present day oil and gas production wells, TFL (through-flow-line) tools are used for controlling various functions. Flow lines for such tools should not have sharp bends and should have a uniform passage flow area to assure proper movement of such tools in the flow line.

The use of multiple coacting switches is encountered in many systems and in most of such systems each switch may have both out lines and return lines. In such systems, it is important that the switches function substantially simultaneously and have some type of mechanical interconnections to assure such functioning which interconnections are expensive and relatively unreliable.

Examples of such prior art structures are shown in the R. I. Kunz et al U.S. Pat. No. 3,826,539, the G. E. Lewis et al U.S. Pat. No. 3,674,123, the W. Brown U.S. Pat. No. 3,545,474, the H. Allen U.S. Pat. No. 2,749,082, the M. L. Barrett, Jr. U.S. Pat. No. 3,047,020 and the G. Larsson U.S. Pat. No. 3,146,033. The J. V. Pennington U.S. Pat. No. 3,780,756 discloses a switching device for TFL tools which is actuated by the passage of a tool through the switch.

Also known are actuators utilizing an annular piston surrounding a shaft, which is keyed to the piston by helical splines, rods or other means to prevent relative rotation of the piston, as shown in the J. C. Miller U.S. Pat. No. 2,936,737.

A further summary of diverters for TFL tools is set forth in the ASME publication entitled "Diverters for T.F.L. Tools" by Andre H. Drouin and John H. Fowler (69-Pet-4) from the ASME Petroleum Mechanical Engineering Conference at Tulsa, Okla. Sept. 21-25, 1969.

SUMMARY

The present invention relates to an improved flow line switch which is suitable for use with TFL tools.

The improved flow line switch includes a housing with a rotor mounted therein and an annular space surrounding the rotor within the housing in which an annular piston is positioned for movement responsive to pressure differentials created thereacross. The rotor provides at least one passage which is adapted to connect from at least one port in one end of the housing selectively to one of at least two ports in the other end of the housing, the rotor, the housing and the piston being connected so that axial movement of the piston rotates the rotor to switch the flow.

An object of the present invention is to provide an improved flow line switch which effectively prevents flow into the closed branch of the flow lines.

Another object is to provide an improved flow line switch for switching more than one flow line without having interconnecting linkages, gears or other mechanisms to assure substantially simultaneous switching.

A further object is to provide an improved flow line switch capable of handling TFL tools.

Still another object is to provide an improved flow line switch with a hydraulic actuator which provides equal force in either direction, uses equal volumes of hydraulic fluid in both directions and has suitable indexing to insure exact register of the passage through the switch with the inlet and outlet.

BRIEF DESCRIPTION OF THE DRAWINGS

These and other objects and advantages of the present invention are hereinafter set forth and explained with reference to the drawings wherein:

FIG. 8 is a sectional view of the preferred piston for use in the switch shown in FIGS. 1 through 6 with the view being taken along line 8—8 in FIG. 9.

FIG. 9 is an end view of the preferred piston structure.

DESCRIPTION OF THE PREFERRED EMBODIMENT

Figure 1:
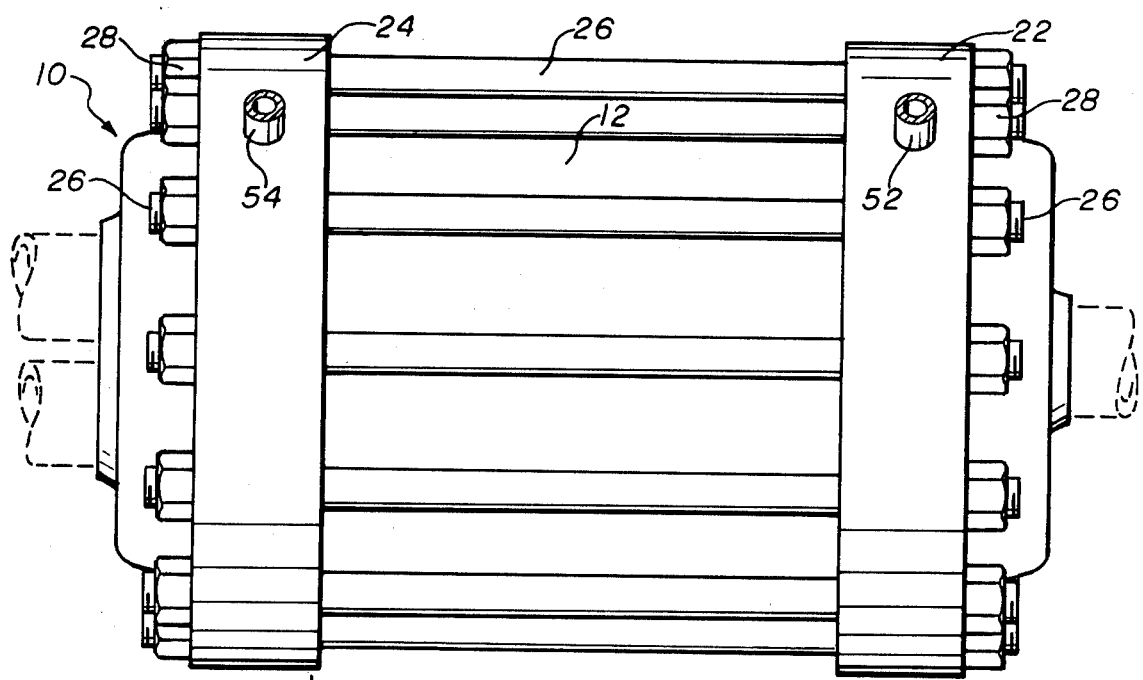
FIG. 1 is a plan view of the preferred embodiment of the flow line switch of the present invention.
Figure 2:
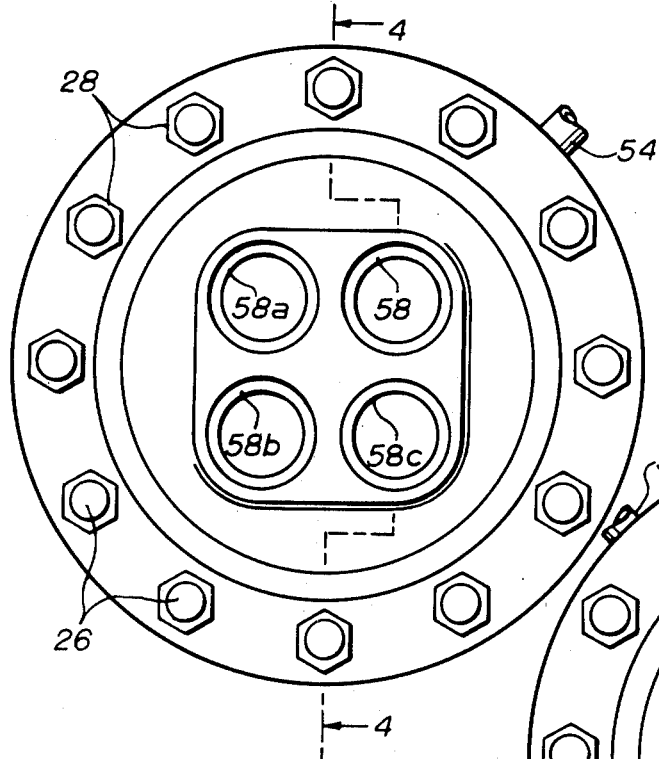
FIG. 2 is a left hand elevation view of the switch shown in FIG. 1.
Figure 3:
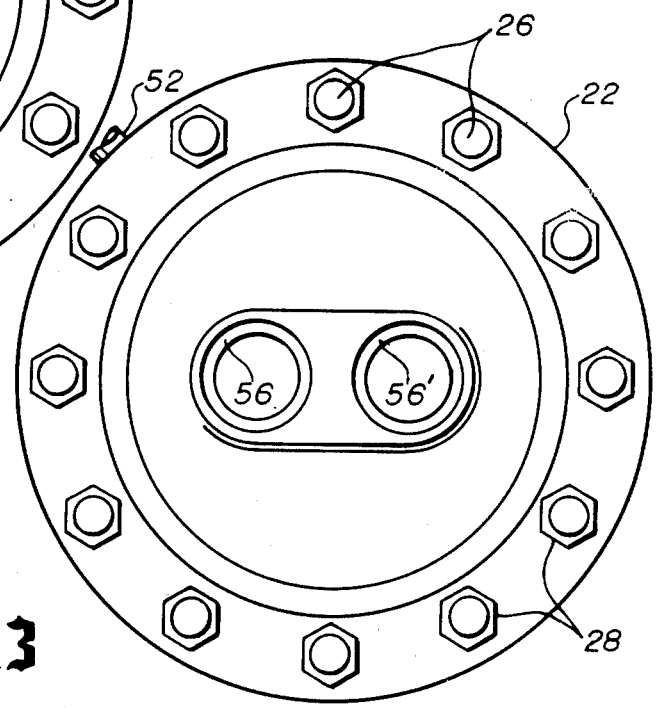
FIG. 3 is a right hand elevation view of the switch shown in FIG. 1.

Flow line switch 10 shown in FIGS. 1-6 includes housing 12, rotor 14 within housing 12 and annular piston 16 positioned for reciprocation in the longitudinally extending annular space 18 between rotor 14 and the interior of housing 12. Housing 12 includes tubular body 20 and end flanges 22 and 24 which are suitably sealed to body 20. Studs 26 and nuts 28 hold flanges 22 and 24 on body 20. Body 20 has a central bore 30. Flanges 22 and 24 have a plurality of ports, hereinafter described in detail, for communication to and from the flow line switch.

The rotor 14 includes the tubular shell 32, end plates 34 and 36 welded or suitably secured to shell 32 and curved tubes 38 and 38' which form passages from ports 40 and 40' in end plate 34 to ports 42 and 42' in end plate 36. The exterior of shell 32 has helical splines 44 which mate with the splines 46 on piston 16. The interior of body 20 has helical splines 48 which mate with the splines 50 on the exterior of piston 16. The piston includes means such as resilient rings for sealing against the splines 44 and 48. Piston 16 includes body 16a, sealing rings 16b, follower rings 16c, and cap screws 16d threaded into one of followers 16c with springs 16e between the screw heads and the other follower 16c to retain the components as an assembly.

Hydraulic fluid for operation of piston 16 is delivered to opposite ends of annular space 18 through passage 52 in end flange 22 and passage 54 in end flange 24. When hydraulic fluid is delivered through passage 52, the hydraulic fluid on the other side of piston 16 is vented through passage 54. Splines 44 to 50 provide a means for rotating rotor 14 responsive to the movement of piston 16. It is preferred that the splines 44, 46, be a helix of 40° in one direction and the splines 48, 50 be a helix of 40° in the opposite direction. Thus, movement of piston 16 causes piston 16 to rotate because body 20 is held stationary. The movement of piston 16 causes rotor 14 to rotate in the same direction at twice the rate of piston 16. Different splines may be used, such as having the splines 48-50 extend parallel to the axis of the housing 12, provided that sufficient rotation of rotor 14 is achieved from its available movement to properly position curved tubes 38 and 38'.

The positioning of rotor 14 to assure proper registry of the ports 40 and 42 in end plates 34 and 36 with ports 56 and 56' in end flange 22 and ports 58, 58a, 58b and 58c in end flange 24 at each end of the stroke of piston 16 is provided by the pin 60 which is secured in end flange 22 and extends into groove 62 in end plate 34. When pin 60 engages the end of groove 62 further rotation of rotor 14 is prevented. Thus groove 62 is designed so that it ends in the proper position to cause rotor 14 to be in the desired position at the end of each stroke of piston 16.

Each of ports 56, 56', 58, 58a, 58b and 58c is provided with a valve seat assembly 64 which is adapted to engage the face of end plates 34 and 36 and when the ports are in registry to provide a seal around the ports. Counterbore 66 and groove 68 are provided around the ports in end closures 22 and 24. The valve seat assembly includes tubular sleeve 70 having outwardly flaring flange 72, spring 74 which is positioned between flange 72 and shoulder 76 formed by counterbore 66 and seal ring 78 positioned in groove 68. Springs 74 urge sleeves 70 against the outer surface of end plates to prevent bleeding of substantial quantities of the fluids flowing through the flow line switch into the interior of housing 12. Some leakage is to be expected particularly during rotation of rotor 14. To equalize pressure across the ends of rotor 14, vents 80 extend through end plates 34 and 36.

Dual seals 82 and 84 are provided at each end of rotor 14 to seal between rotor 14 and the interior surfaces 86 of end closures 22 and 24. Groove 88 in surface 86 extends completely around rotor 14 and passageway 90 communicate from groove 88 to the exterior of housing 12 to assure the piston actuating fluid is not transmitted to the interior of ducts 38 or the ports.

Figure 4:
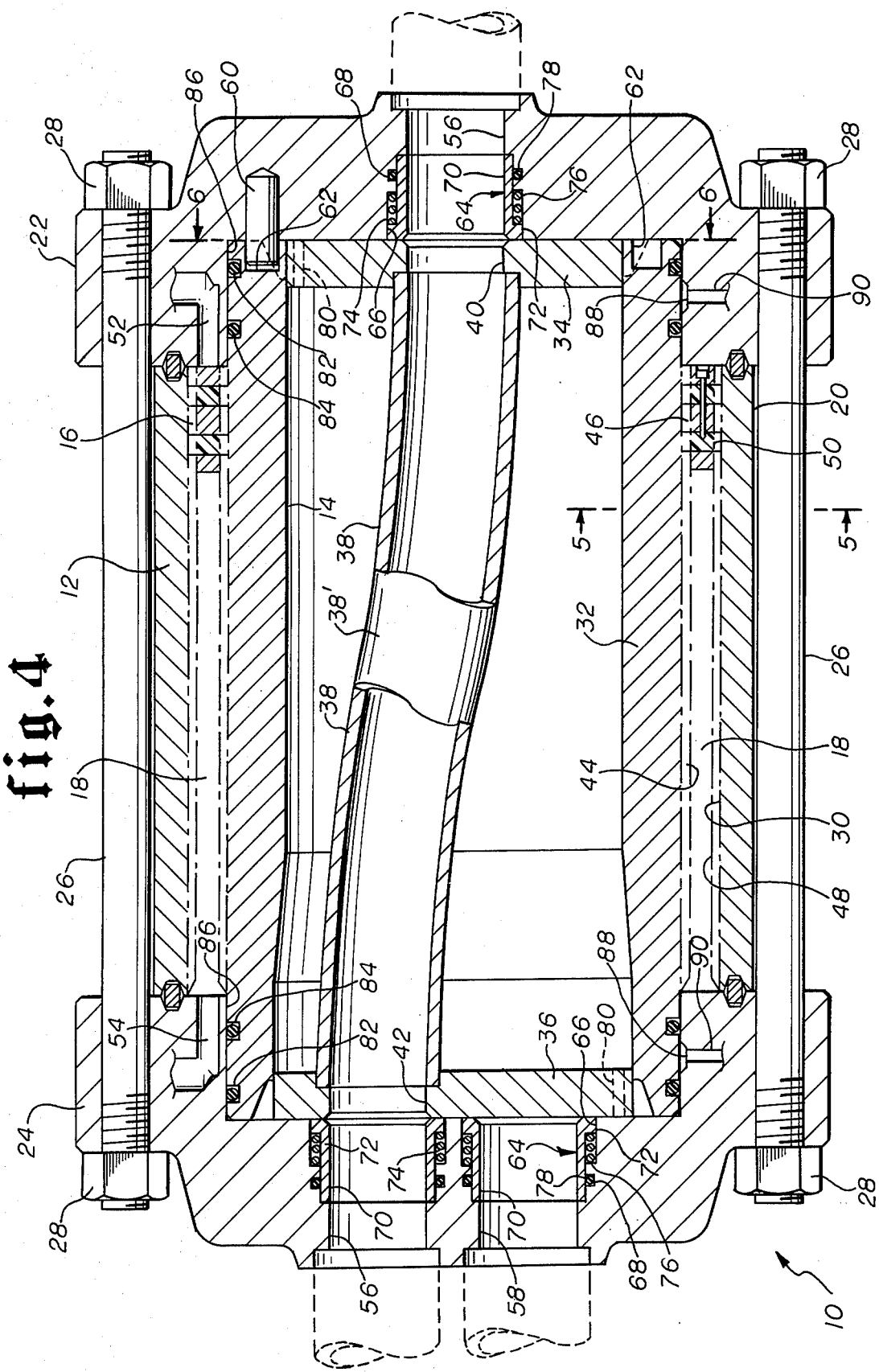
FIG. 4 is a sectional view of the switch taken along line 4—4 in FIG. 2.
Figure 5:
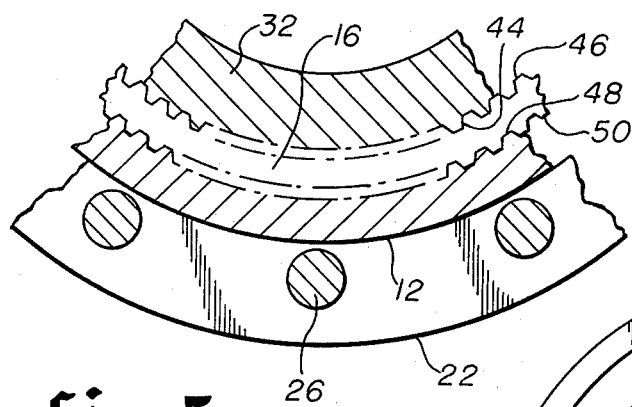
FIG. 5 is a partial sectional view taken along line 5—5 in FIG. 4.
Figure 6:
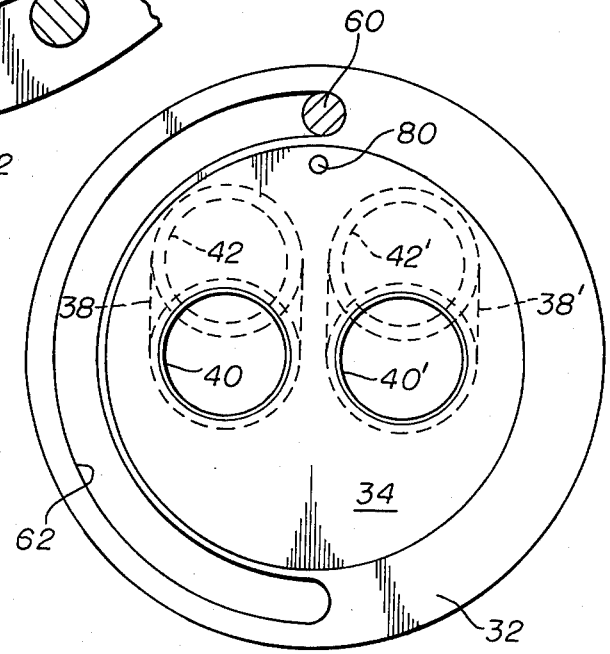
FIG. 6 is a sectional view taken along line 6—6 in FIG. 4.

In operation switch 10 is presumed to be in the position shown in FIG. 4 so that tube 38 connects from port 56 to port 58 and tube 38' connects from port 56' to port 58a. Pin 60 is positioned in the end of groove 62 as shown in FIG. 6 and piston 16 is in its far right-hand position. Movement is started by supplying a motive fluid such as an oil or other suitable liquid to passage 52 and venting passage 54. This causes piston 16 to move to the left and because of the helical splined connections to housing 12 and rotor 14 causes rotor 14 to rotate.

When pin 60 reaches the opposite end of groove 62 further rotation of rotor is stopped and piston 16 is then in its leftmost position. In the position tube 38 connects from port 56' to port 58b and tube 38' connects from port 56 to port 58c.

To reverse the operation, passage 52 is vented and motive fluid is supplied to passage 54. This causes piston 16 to move to the position illustrated in FIG. 4.

Figure 7:
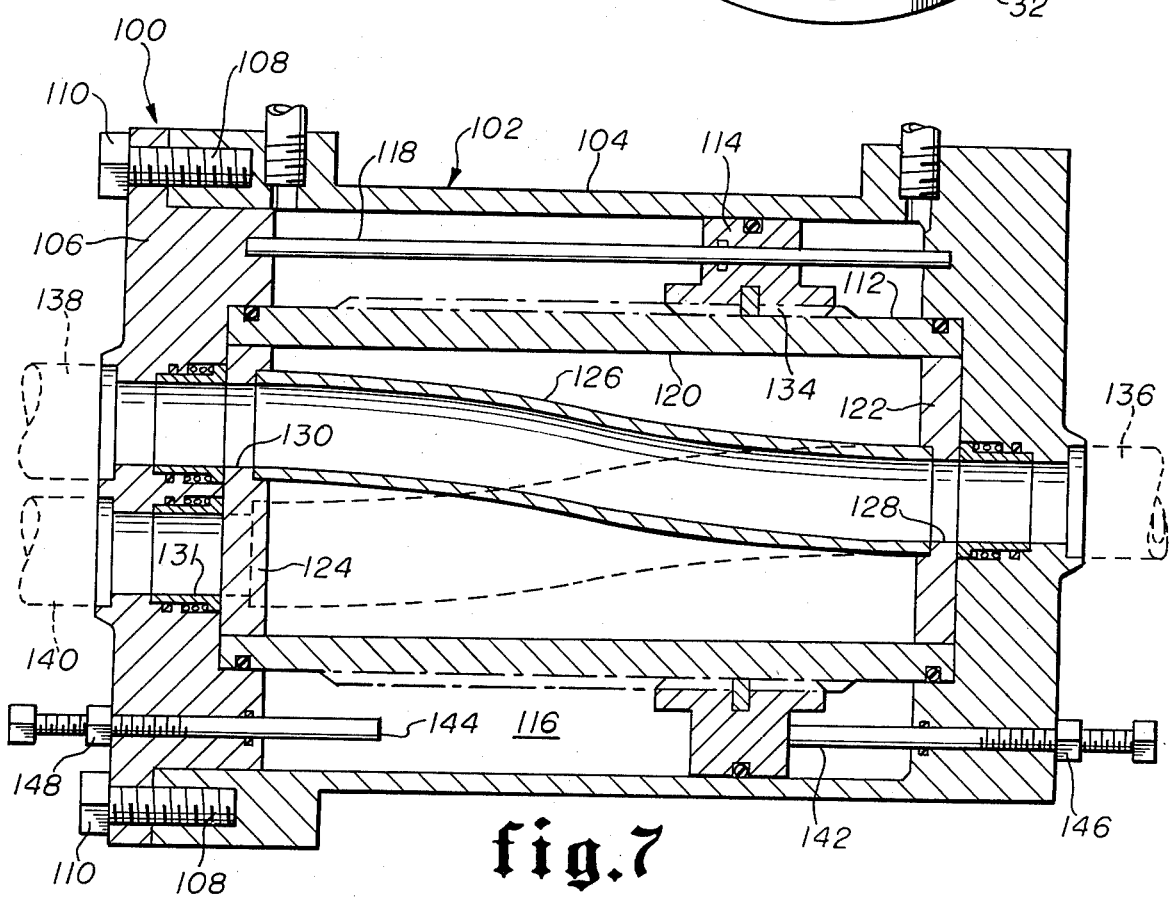
FIG. 7 is a longitudinal sectional view of a modified form of flow line switch.

Flow line switch 100 as shown in FIG. 7 is a modified form of the present invention. Switch 100 includes housing 102 formed by body 104 and end closure 106 secured thereto by studs 108 and nuts 110, rotor 112 and annular piston 114 positioned and adapted to reciprocate in the annular space 116 between rotor 112 and body 104. Rods 118 secured in housing 102 extend through piston 114 and form guides on which piston 114 slides to prevent it from rotating.

Rotor 112 includes sleeve 120, end plates 122 and 124 and curved tube 126 extending from port 128 in end plate 122 to port 130 in end plate 124. The exterior of sleeve 120 has helical splines 132 which engage the splines 134 on the interior of piston 114 so that longitudinal movement of piston 114 causes rotor 112 to rotate whereby communication is established between duct 136 and one of ducts 138 and 140 depending on the position of curved tube 126. The alternate position of tube 126 when connecting to port 131 and to duct 140 is shown in dashed lines in FIG. 7. Screws 142 and 144 with lock nuts 146 and 148 thereon extend into the ends of annular space 116 to provide stops limiting the movement of piston 114.

Switch 100 shown in FIG. 7 is operated by supplying motive fluid to space 116 on one side of piston 114 while venting the space from the other side through suitable passages (not shown). The pressure of fluid on the right side of piston 114, as shown in FIG. 7, causes it to move to the left until it reaches the stop 144. Since stop 144 is preset to control the length of stroke of piston 114, rotor 112 is turned to the position shown in dashed lines so that duct 136 is connected through tube 126 and port 131 to duct 140. Rotor 112 is rotated by its helical splined connection to piston 116 since rods 118 prevent piston 116 from rotating.

Return of rotor 112 to its original position is accomplished by supplying motive fluid in space 116 on the left side of piston 114 and venting space 116 on the opposite side. Pin 142 stops the movement of piston 114 to assure proper registry of tube 126 with port 130 and in communication with duct 138.

What is claimed is:
1. A flow line switch comprising
   a housing having an internal cylindrical chamber,
   at least one passage communicating through the housing into one end of the chamber,
   at least two passages communicating through the housing into the other end of the chamber,
   a rotor positioned within the chamber against the ends thereof and having an exterior cylindrical surface spaced from the interior cylindrical surface of the housing to form an annular space and a tube extending through the rotor to communicate between the ends of the chamber,
   an annular piston positioned within said annular space,
   means for introducing an actuating fluid into either end of said annular space to cause the piston to reciprocate therein, and
   means connecting the piston with the rotor and the piston with the housing so that movement of the piston in one direction rotates the rotor and movement of the piston in the opposite direction reverses the direction of rotation of the rotor whereby the tube provides a change of communication between the housing end passages.
2. A flow line switch according to claim 1 wherein said connecting means includes
   a helical spline connection between the piston and said rotor, and
   means connecting between the piston and the housing to assure that movement of the piston causes rotation of the rotor to rotate.
3. A flow line switch according to claim 2 wherein said connecting means between the piston and the housing includes
   a helical spline connection.

4. A flow line switch according to claim 3 including sealing means on the piston for sealing the splines to prevent leakage of operating fluid past the piston.

5. A flowline switch according to claim 2 wherein said connecting means between the piston and the housing includes
   at least one rod extending axially through said annular space and through the piston.

6. A flow line switch according to claim 5 wherein only a single tube extends through the rotor to communicate between said end passages.

7. A flow line switch according to claim 1 including
   means for limiting the rotation of the rotor responsive to the movement of the piston to assure registry of the rotor passageway with the preselected housing passages at each end of the movement of the piston.

8. A flow line switch according to claim 7 wherein said rotor limiting means includes
   at least one stop pin mounted in the housing and projecting into a semi-annular groove in the end of the rotor.

9. A flow line switch according to claim 7 wherein said rotor limiting means includes
   a pair of adjustable stops positioned one in each end of said annular space.

10. A flow line switch according to claim 9 wherein said stops extend through the housing and are threaded therein for adjustment of the stopping positions of the piston.

11. A flow line switch according to claim 1, including means for equalizing pressure between the interior and the exterior of the rotor.

12. A flow line switch according to claim 1, including
    a sleeve in each of the housing passages,
    means for resiliently urging each sleeve into sliding engagement with the rotor ends and to seal around the rotor passage when it is in registry with said sleeve.

13. A flow line switch according to claim 1 wherein said piston includes
    a body ring,
    packing rings on each side of said body ring, and
    means for retaining said rings assembled.

14. A flow line switch according to claim 1 including
    two housing passages communicating into said one end of the chamber,
    four housing passages communicating into said other end of said chamber, and
    a pair of tubes extending through the rotor to communicate between said end passages.

* * * * *